United States Patent
Wu et al.

(10) Patent No.: US 8,264,163 B2
(45) Date of Patent: Sep. 11, 2012

(54) BACKLIGHT APPARATUS AND TRANSFORMER THEREOF

(75) Inventors: Ming-Yen Wu, Taoyuan (TW); Ching-Chang Hsieh, Yangmei Town (TW); Ming-Feng Liu, Lujhu Township, Taoyuan County (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 524 days.

(21) Appl. No.: 12/611,449

(22) Filed: Nov. 3, 2009

(65) Prior Publication Data

US 2010/0118561 A1    May 13, 2010

(30) Foreign Application Priority Data

Nov. 7, 2008 (TW) ............................... 97220033 U

(51) Int. Cl.
*H05B 41/14* (2006.01)
(52) U.S. Cl. ......................................... 315/254; 307/83
(58) Field of Classification Search .................. 336/182, 336/183, 220; 315/114, 254–257, 266, 324; 307/17, 83; 323/262, 332, 333, 361; 362/559; 361/603, 729
See application file for complete search history.

(56) References Cited

U.S. PATENT DOCUMENTS

| | | | | |
|---|---|---|---|---|
| 2,413,681 A * | 1/1947 | Bridges | ........................ | 315/231 |
| 6,310,444 B1* | 10/2001 | Chang | ........................... | 315/282 |
| 7,408,306 B2* | 8/2008 | Tanaka et al. | ................. | 315/277 |
| 7,424,147 B2* | 9/2008 | Obrador | ........................ | 382/162 |
| 7,459,863 B2* | 12/2008 | Hsueh et al. | .................. | 315/282 |
| 7,525,258 B2* | 4/2009 | Kim et al. | ..................... | 315/282 |
| 7,528,552 B2* | 5/2009 | Chan et al. | .................... | 315/282 |
| 7,948,736 B2* | 5/2011 | Liu et al. | ....................... | 361/268 |
| 2005/0099143 A1* | 5/2005 | Kohno | .......................... | 315/312 |
| 2007/0278970 A1* | 12/2007 | Hsueh et al. | ................. | 315/278 |
| 2008/0048580 A1* | 2/2008 | Hsueh et al. | ................. | 315/278 |
| 2009/0160352 A1* | 6/2009 | Nishida et al. | ............... | 315/276 |

FOREIGN PATENT DOCUMENTS

| | | |
|---|---|---|
| EP | 2288233 A1 | 2/2011 |
| KR | 20020074156 A | 9/2002 |
| KR | 1020090107297 A | 10/2009 |
| KR | 1020110010540 A | 2/2011 |
| WO | 0230161 A2 | 4/2002 |

* cited by examiner

*Primary Examiner* — Nimeshkumar Patel
*Assistant Examiner* — Christopher Raabe
(74) *Attorney, Agent, or Firm* — Winston Hsu; Scott Margo

(57) ABSTRACT

A transformer is disclosed. The transformer includes a first pin, a second pin, a first side winding, a second side winding, and a jump pin. The second side winding is coupled to the first pin and the second pin. The first pin is between the jump pin and the second pin. The jump pin is coupled to the second pin inside the transformer.

17 Claims, 7 Drawing Sheets

BACKLIGHT APPARATUS AND TRANSFORMER THEREOF

BACKGROUND OF THE INVENTION

1. Field of the Invention

The invention relates to a transformer, and more particularly, to a transformer with a jump pin and a backlight apparatus including the transformer with the jump pin.

2. Description of the Prior Art

In recent years, with the increasing of the size of the liquid crystal display (LCD) panel, a backlight apparatus including a plurality of cold cathode fluorescent lamps (CCFLs) is used widely to provide high quality light sources for the LCD panel.

However, since the number of the light pipes and the transformers used in the conventional backlight apparatus with multiple light pipes is increasing, no matter at the high-voltage side or the low-voltage side, the connecting wires among the transformers are usually crossed with each other. In order to prevent the crossed connecting wires from being interfered with each other, a "jump" connecting way is used in the connecting wires to keep a suitable distance between the crossed connecting wires.

Please refer to FIG. 1. FIG. 1 shows a backlight apparatus with a jump structure. As shown in FIG. 1, the backlight apparatus 9 includes a power source 90, a first transformer 91, a second transformer 92, a first light pipe 93, a second light pipe 94, and a jump structure 95. Wherein, the first transformer 91 includes a first pin 911, a second pin 912, a third pin 913, a fourth pin 914, a first secondary winding 915, and a first primary winding 916; the second transformer 92 includes a fifth pin 921, a sixth pin 922, a seventh pin 923, an eighth pin 924, a second secondary winding 925, and a second primary winding 926.

In the first transformer 91, the first primary winding 916 is coupled to the first pin 911 and the second pin 912; the first pin 911 and the second pin 912 are coupled to the first light pipe 93 and the power source 90 respectively. Because the wire between the first pin 911 and the first light pipe 93 crosses the wire between the second pin 912 and the power source 90, there will be the jump structure 95 on the wire between the second pin 912 and the power source 90, so that the two crossed wires can keep a suitable distance between them.

Please refer to FIG. 2. FIG. 2 shows another backlight apparatus with a jump structure. As shown in FIG. 2, the backlight apparatus 8 includes a power source 80, a first transformer 81, a second transformer 82, a third transformer 83, a first light pipe 84, a second light pipe 85, a third light pipe 86, a first jump structure 87, and a second jump structure 88.

Wherein, the first transformer 81 includes a first pin 811, a second pin 812, a third pin 813, a fourth pin 814, a first primary winding 815, and a first secondary winding 816; the second transformer 82 includes a fifth pin 821, a sixth pin 822, a seventh pin 823, an eighth pin 824, a second primary winding 825, and a second secondary winding 826; the third transformer 83 includes a ninth pin 831, a tenth pin 832, a eleventh pin 833, an twelfth pin 834, a third primary winding 835, and a third secondary winding 836.

In the backlight apparatus 8, the first secondary winding 816 is coupled to the first pin 811 and the second pin 812; the second secondary winding 826 is coupled to the fifth pin 821 and the sixth pin 822; the third secondary winding 836 is coupled to the ninth pin 831 and the tenth pin 832. Wherein, the first pin 811 is coupled to the first light pipe 84; the fifth pin 821 is coupled to the second light pipe 85; the ninth pin 831 is coupled to the third light pipe 86. Since the first secondary winding 816, the second secondary winding 826, and the third secondary winding 836 are coupled, therefore, the second pin 812, the sixth pin 822, and the tenth pin 832 will be coupled via a first wire.

As shown in FIG. 2, the wire will cross a second wire coupling the fifth pin 821 and the second light pipe 85 and cross a third wire coupling the ninth pin 831 and the third light pipe 86, therefore, a first jump structure 87 and a second jump structure 88 will be set on the first wire, so that the crossed wires can keep a suitable distance between them.

However, no matter the above-mentioned backlight apparatus 9 or 8, since they use a lot of jump structures between their transformers, the wire connections of the circuit layout will become more complicated. In addition, once the number of transformers and light pipes of the backlight apparatus is increasing, the number of the jump structures used in the backlight apparatus will also increase accordingly, therefore, the manufacturing cost of the backlight apparatus will be increased and the competitiveness of the backlight apparatus on the market will be reduced.

Therefore, the invention provides a transformer with a jump pin and a backlight apparatus including the transformer to solve the above-mentioned problems.

SUMMARY OF THE INVENTION

The invention provides a backlight apparatus and a transformer thereof. The transformer is applied to a multiple light pipe backlight apparatus to make the currents of the light pipes are approximately the same to make sure that the light source provided to the LCD panel can have very stable and uniform lightness. In fact, the transformer can have a one-to-one structure or a one-to-many structure, namely the transformer can correspond to a light pipe or several light pipes at the same time.

A first embodiment of the invention is a transformer. The transformer is applied to a backlight apparatus. The transformer includes a first pin, a second pin, a first side winding, a second side winding, and a jump pin. The second side winding is coupled to the first pin and the second pin. The first pin is between the jump pin and the second pin.

It should be noticed that the jump pin is coupled to the second pin inside the transformer, not coupled to the second pin from the outside of the transformer. In this embodiment, the jump pin can be coupled to the second pin via a metal plate embedded in the transformer.

A second embodiment of the invention is a backlight apparatus. The backlight apparatus includes a power source, a first light pipe, and a first transformer. Wherein, the first transformer includes a first pin, a second pin, a first side winding, a second side winding, and a jump pin.

In the first transformer, the second side winding is coupled to the first pin and the second pin. Because the first pin is between the jump pin and the second pin, the jump pin is coupled to the second pin inside the transformer. In fact, the jump pin can be coupled to the second pin via a metal plate embedded in the first transformer.

In practical applications, the backlight apparatus can further includes a second transformer and a second light pipe. The second light pipe is coupled to the second transformer. The second transformer can be coupled to the jump pin or the second pin.

Compared to the prior arts, the transformer provided in this invention and the backlight apparatus including the transformer can reduce the jump structures used between the transformers in the conventional backlight apparatus, so that not only the wire connections in the circuit layout will become simple, but also the manufacturing cost of the backlight apparatus can be lowered to increase the competitiveness of the backlight apparatus on the market.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The invention provides a transformer with a jump pin and a backlight apparatus including the transformer. The backlight apparatus can reduce the jump structures used between the transformers in the conventional backlight apparatus, so that not only the wire connections in the circuit layout will become simple, but also the manufacturing cost of the backlight apparatus can be lowered.

A first embodiment of the invention is a transformer. The transformer is applied to a multiple light pipe backlight apparatus to make the currents of the light pipes are approximately the same to make sure that the light source provided to the LCD panel can have very stable and uniform lightness. In fact, the transformer can have a one-to-one structure or a one-to-many structure, namely the transformer can correspond to a light pipe or several light pipes at the same time.

Figure 3:
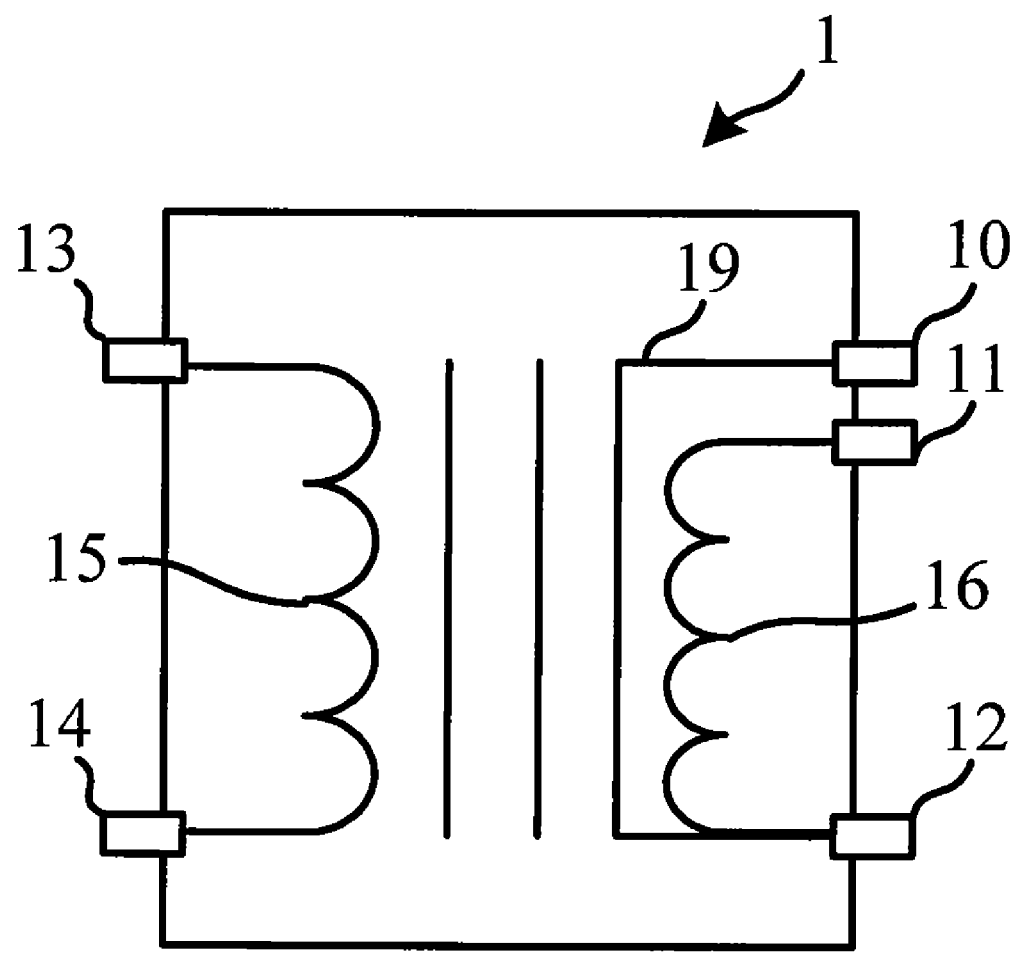
FIG. 3 shows a scheme diagram of the transformer according to the first embodiment of the invention.

Please refer to FIG. 3. FIG. 3 shows a scheme diagram of the structure of the transformer. As shown in FIG. 3, the transformer 1 includes a jump pin 10, a first pin 11, a second pin 12, a third pin 13, a fourth pin 14, a first side winding 15, and a second side winding 16. Wherein, the second side winding 16 is corresponding to the first side winding 15; the second side winding 16 is coupled to the first pin 11 and the second pin 12. The first pin 11 is between the jump pin 10 and the second pin 12.

It should be noticed that in order to reduce the conventional jump structure on the wire, the jump pin 10 is coupled to the second pin 12 inside the transformer 1. In fact, the jump pin 10 can be coupled to the second pin 12 via an inner wire 19 inside the transformer 1, or coupled to the second pin 12 via a metal plate embedded in the transformer 1.

Figure 4A:
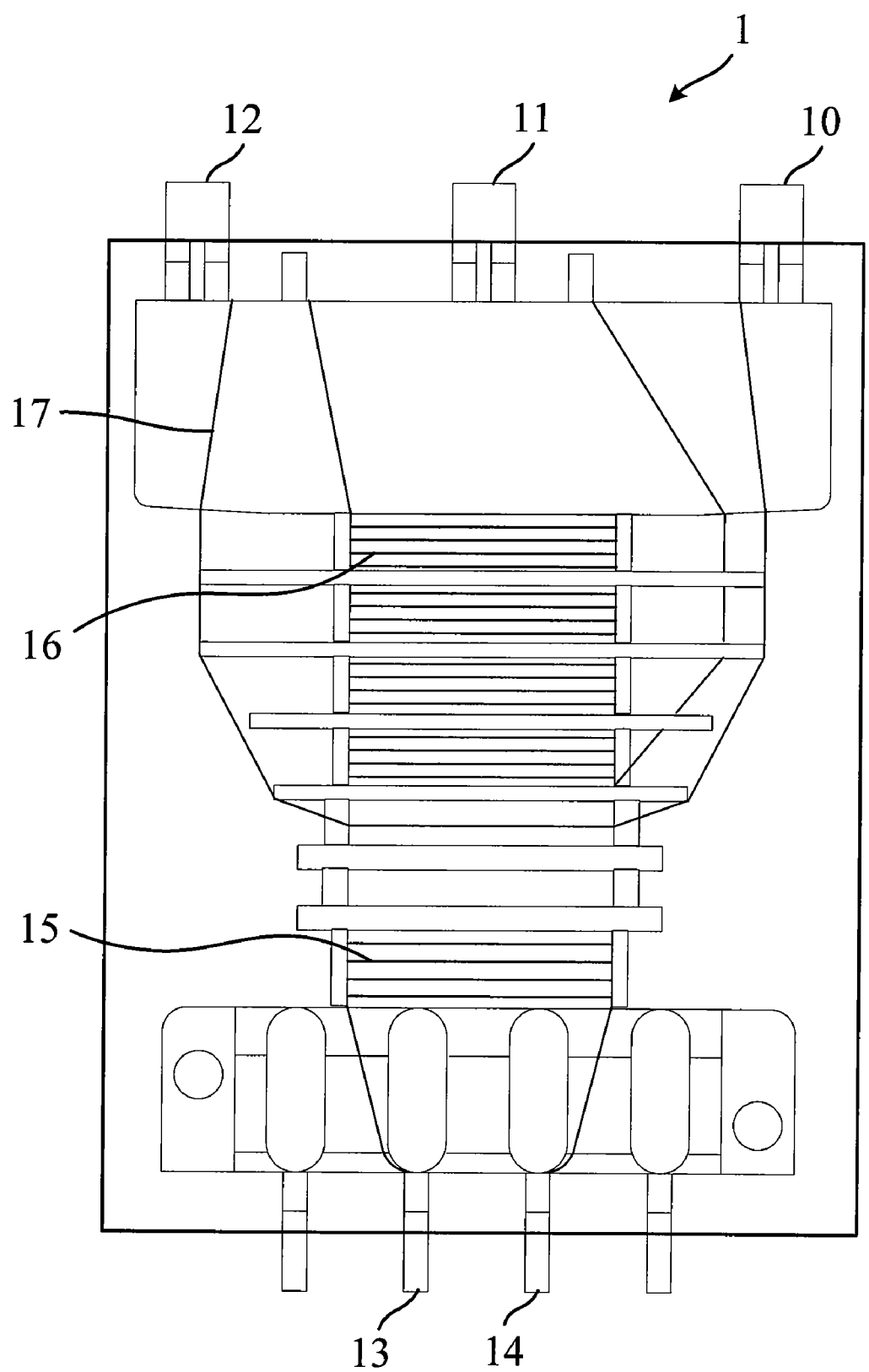
FIG. 4(A) shows a scheme diagram of the jump pin in FIG. 3 coupling to the second pin via a wire inside the transformer.

Please refer to FIG. 4(A). FIG. 4(A) shows a scheme diagram of the jump pin in FIG. 3 coupling to the second pin via a wire inside the transformer. As shown in FIG. 4(A), the jump pin 10 is coupled to the second pin 12 from the inside of the transformer via the wire 17. This is the ordinary way to form an electrical connection.

Figure 4B:
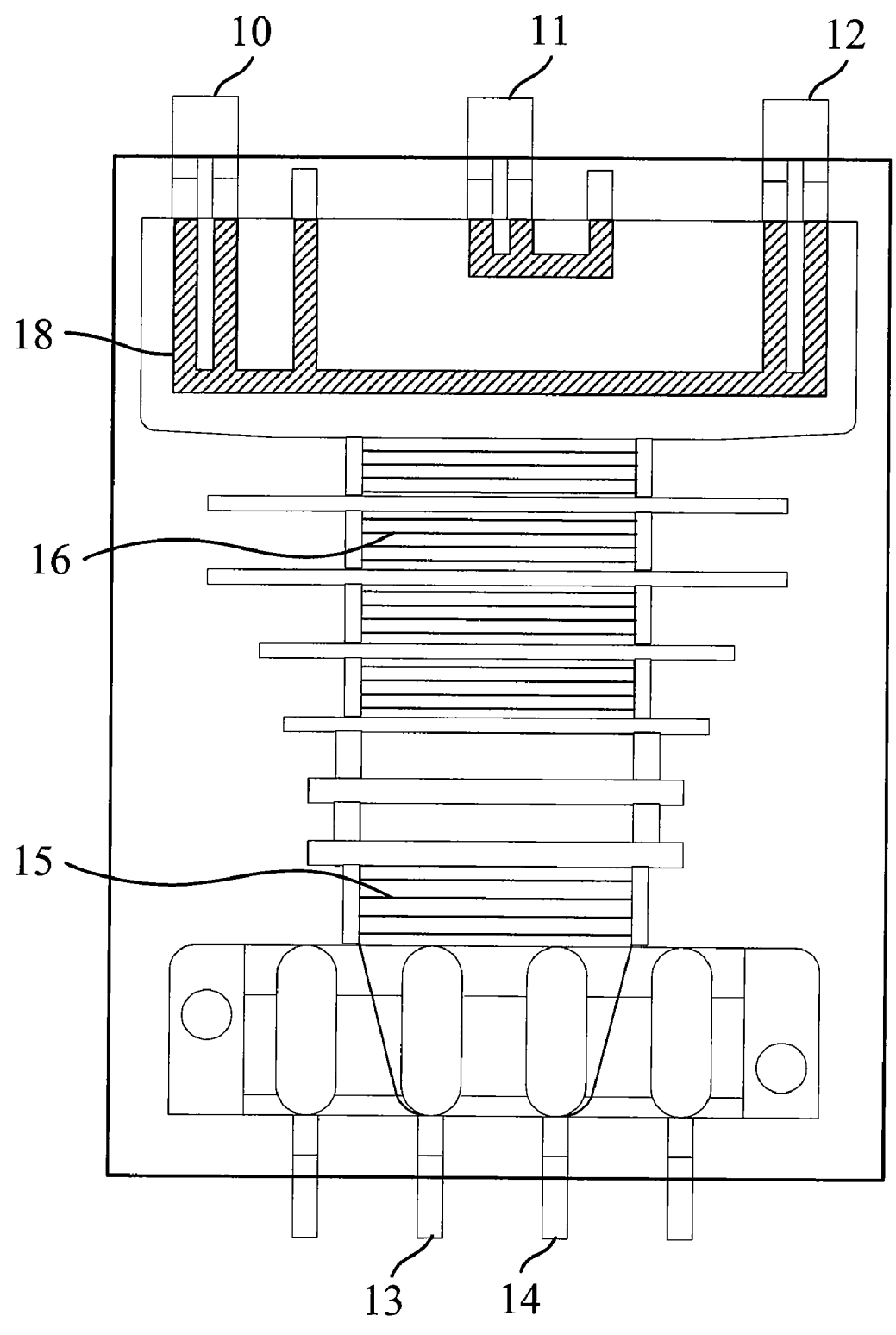
FIG. 4(B) shows a scheme diagram of the jump pin in FIG. 3 coupling to the second pin via a metal plate embedded in the transformer.

Please refer to FIG. 4(B). FIG. 4(B) shows a scheme diagram of the jump pin in FIG. 3 coupling to the second pin via a metal plate embedded in the transformer. As shown in FIG. 4(B), the jump pin 10 is coupled to the second pin 12 from the inside of the transformer via the metal plate 18. In fact, the metal plate 18 can be an iron plate, a copper plate, or any other metal plates capable of conducting electricity.

In this way, since the metal plate is embedded into the transformer to electrically connecting the jump pin 10 and the second pin 12, the time used to manufacturing the transformer can be reduced, and the production efficiency of the transformer can be enhanced.

In practical applications, when the transformer 1 is applied to the backlight apparatus, if the first side winding 15 forms a loop, then the first pin 11 is coupled to the light pipes of the backlight apparatus, and the second pin 12 is coupled to the power source and other transformers of the backlight apparatus; if the first side winding 15 is coupled to the power source of the backlight apparatus, then the first pin 11 is coupled to the light pipes of the backlight apparatus, and the second pin 12 is coupled to the other transformers of the backlight apparatus.

Above all, since transformer 1 can reduce the jump structures used between the transformers in the conventional backlight apparatus, therefore, not only the wire connections in the circuit layout will become simple, but also the manufacturing cost of the backlight apparatus can be lowered.

Figure 5:
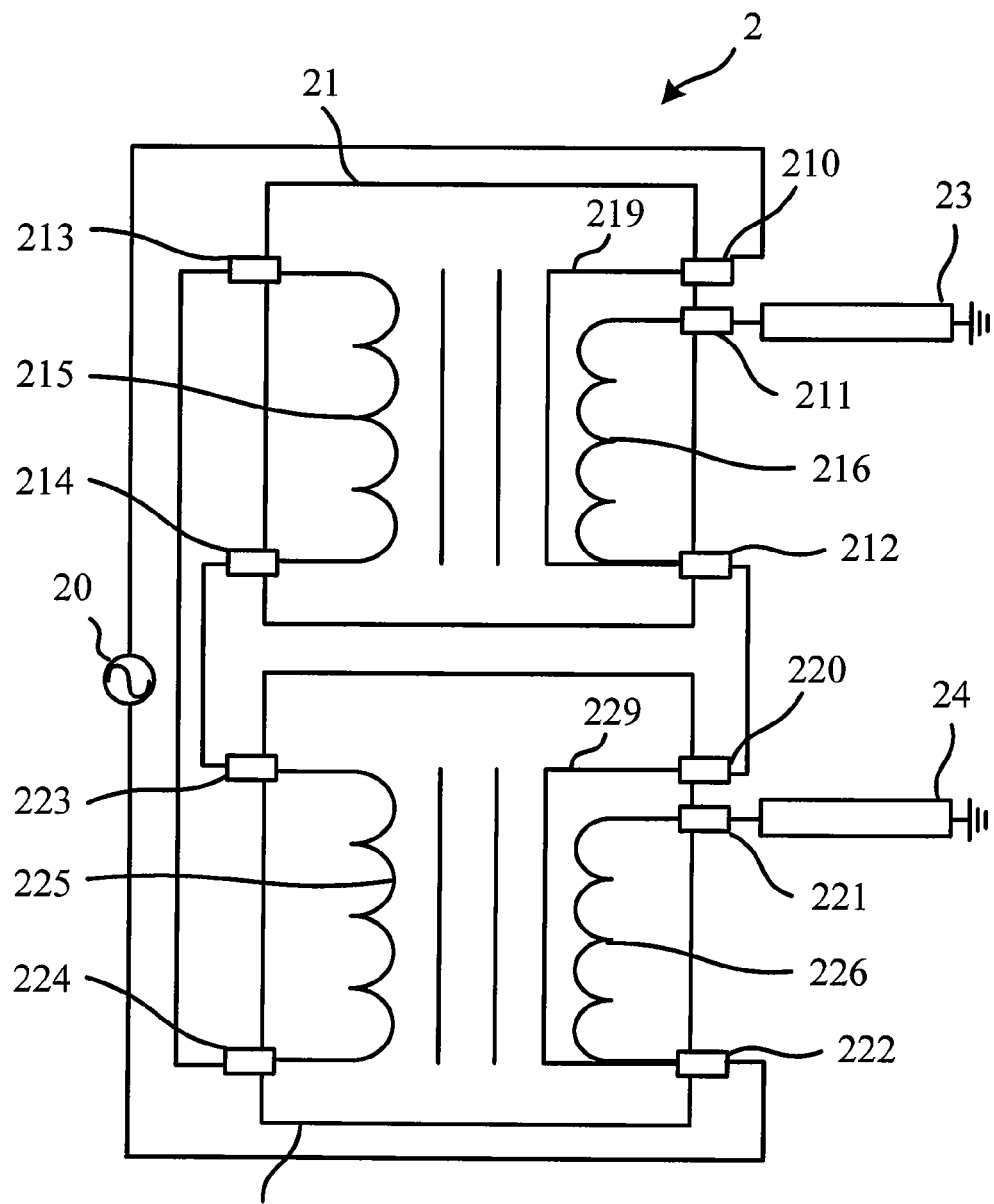
FIG. 5 shows a scheme diagram of the backlight apparatus according to the second embodiment of the invention.

A second embodiment of the invention is a backlight apparatus. Please refer to FIG. 5. FIG. 5 shows a scheme diagram of the structure of the backlight apparatus. As shown in FIG. 5, the backlight apparatus 2 includes a power source 20, a first transformer 21, a second transformer 22, a first light pipe 23, and a second light pipe 24. Wherein, the first transformer 21 is coupled to the first light pipe 23; the second transformer 22 is coupled to the second light pipe 24; the power source 20 is coupled to the first transformer 21 and the second transformer 22, and used to provide the electricity for the first light pipe 23 and the second light pipe 24 to emit lights.

Next, the first transformer 21 and the second transformer 22 will be introduced respectively. In this embodiment, the first transformer 21 includes a first jump pin 210, a first pin 211, a second pin 212, a third pin 213, a fourth pin 214, a first secondary winding 215, and a first primary winding 216. Wherein, the first primary winding 216 is corresponding to the first secondary winding 215; the first primary winding 216 is couple to the first pin 211 and the second pin 212; the first pin 211 is between the first jump pin 210 and the second pin 212; the first jump pin 210 is coupled to the power source 20.

It should be noticed that in order to reduce the conventional jump structure in the circuit of the backlight apparatus 2, the jump pin 210 is coupled to the second pin 212 inside the first transformer 21. In fact, the jump pin 210 can be coupled to the second pin 212 via an inner wire 219 inside the first transformer 21, or coupled to the second pin 212 via a metal plate embedded in the first transformer 21.

In fact, the metal plate can be an iron plate, a copper plate, or any other metal plates capable of conducting electricity. In this way, since the metal plate is embedded into the transformer to electrically connecting the first jump pin 210 and the second pin 212, the time used to manufacturing the first transformer 21 can be reduced, and the production efficiency of the first transformer 21 can be enhanced.

Similarly, the second transformer 22 includes a second jump pin 220, a fifth pin 221, a sixth pin 222, a seventh pin 223, a eighth pin 224, a second secondary winding 225, and a second primary winding 226. Wherein, the second primary winding 226 is corresponding to the second secondary winding 225; the second primary winding 226 is couple to the fifth pin 221 and the sixth pin 222; fifth pin 221 is between the second jump pin 220 and the sixth pin 222; the sixth pin 222 is coupled to the power source 20; the second jump pin 220 will be coupled to the second pin 212 of the first transformer 21.

It should be noticed that the seventh pin 223 will be coupled to the fourth pin 214 of the first transformer 21; the eighth pin 224 will be coupled to the third pin 213 of the first transformer 21. That is to say, the first secondary winding 215 of the first secondary winding 21 will be coupled to the second secondary winding 225 of the second transformer 22 to form a loop.

In practical applications, in order to reduce the conventional jump structure in the circuit of the backlight apparatus 2, the second jump pin 220 is coupled to the sixth pin 222 inside the second transformer 22. In fact, the second jump pin 220 can be coupled to the sixth pin 222 via an inner wire 229 inside the second transformer 22, or coupled to the sixth pin 222 via a metal plate embedded in the second transformer 22.

Figure 1:
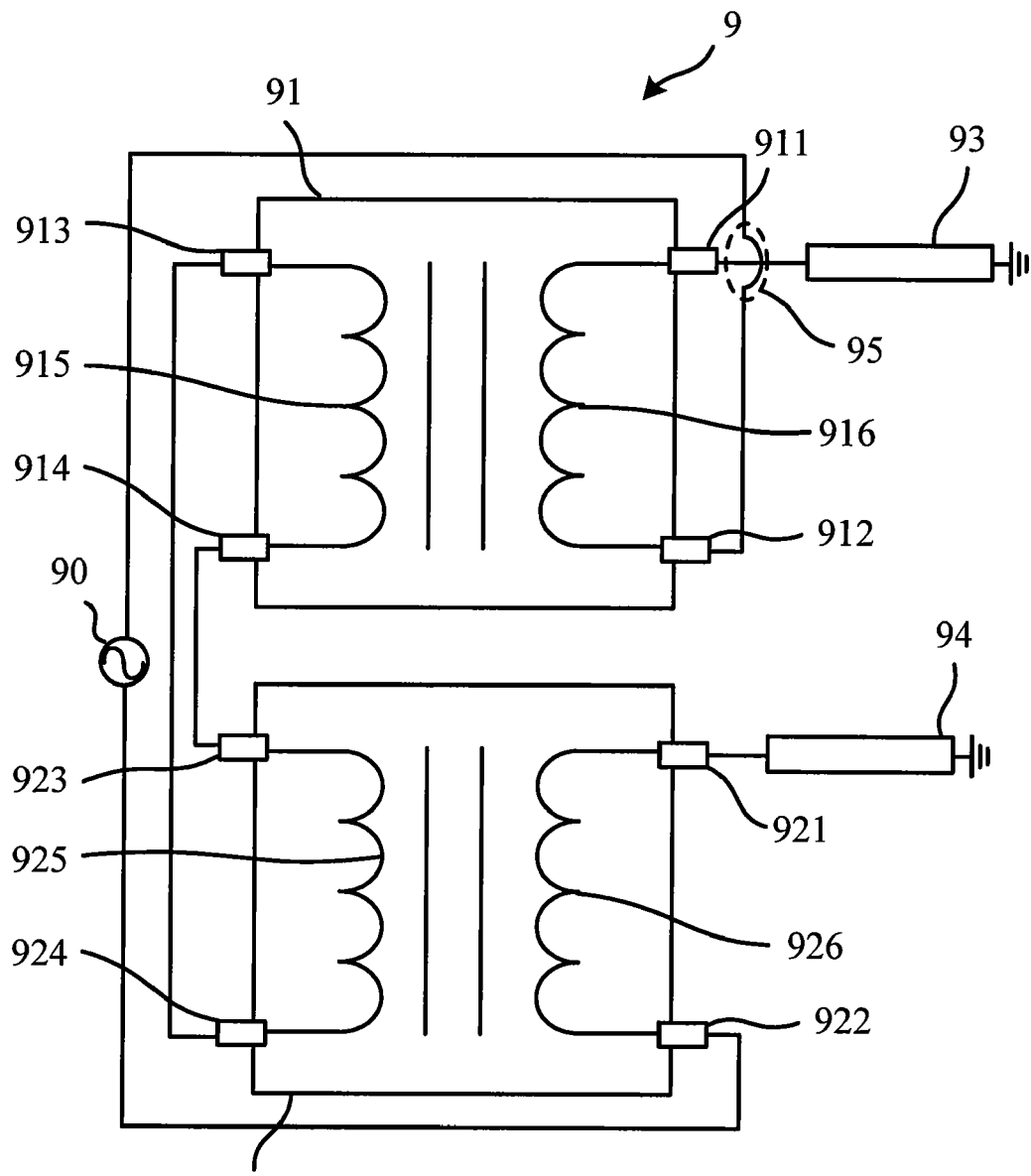
FIG. 1 shows a scheme diagram of a backlight apparatus with a jump structure in the prior art.

Then, the backlight apparatus 2 shown in FIG. 5 and the backlight apparatus 9 with a jump structure 95 shown in FIG. 1 will be compared to show the advantages of the backlight apparatus 2 disclosed in this embodiment.

In the first transformer 91 of the backlight apparatus 9, since the first wire between the first pin 911 and the first light pipe 93 will cross the second wire between the second pin 912 and the power source 90, therefore, there will be the jump structure 95 on the second wire between the second pin 912 and the power source 90, so that there will be a suitable distance between the crossed first wire and second wire.

However, in the first transformer 21 of the backlight apparatus 2 disclosed by this embodiment, since the second pin 212 is coupled to the first jump pin 210 through the inside of the first transformer 21 and the first jump pin 210 is coupled to the power source 20 instead of being directly coupled to the power source 20. By doing so, the wire connection in the circuit of the backlight apparatus 2 can be performed through the inside of the first transformer 21. Therefore, the backlight 2 can effectively reduce the jump structure 95 in the conventional circuit, not only the wire connections of the circuit layout will become simpler, but also the manufacturing cost of the backlight apparatus 2 can be lowered.

Figure 6:
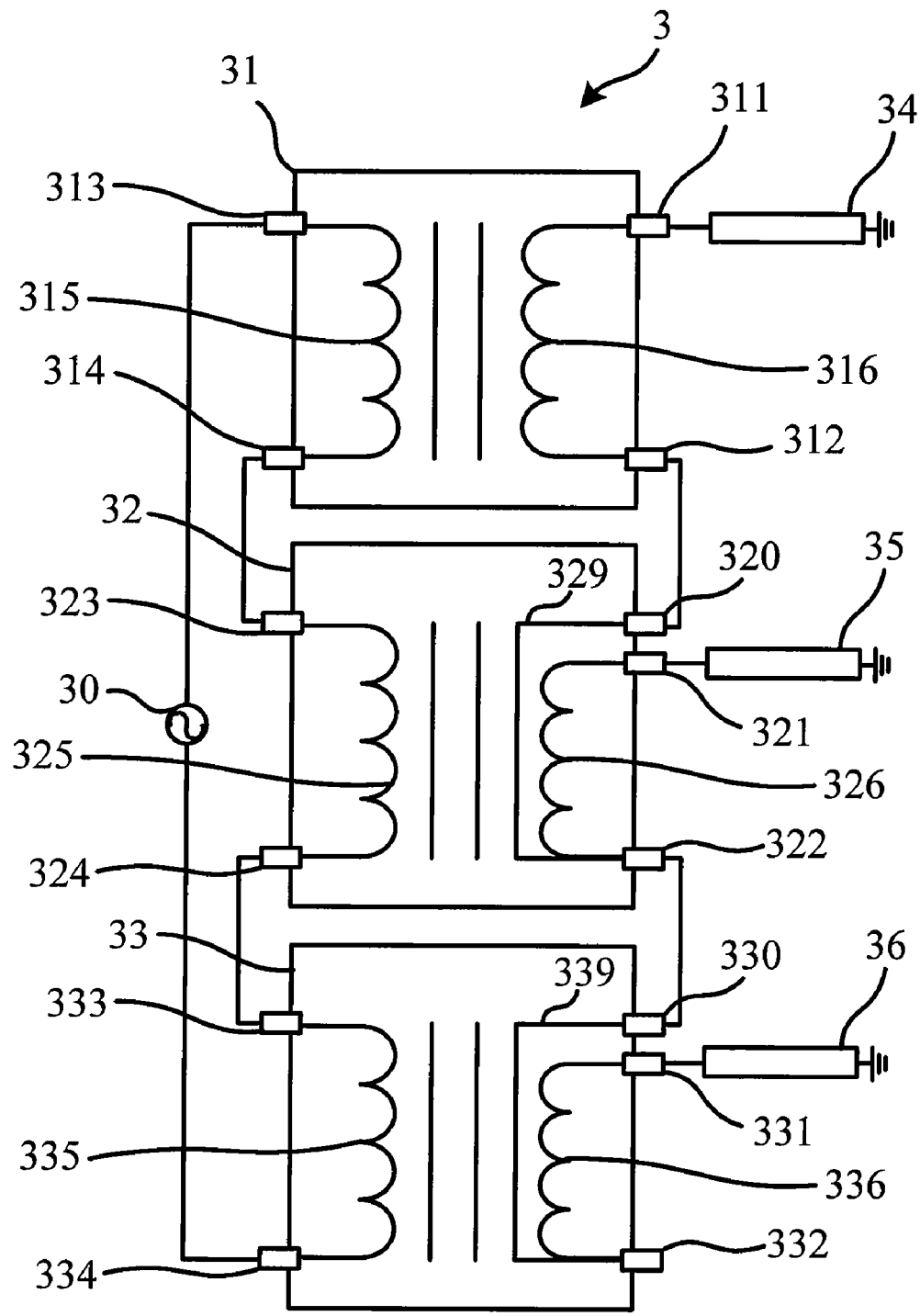
FIG. 6 shows a scheme diagram of the backlight apparatus according to the third embodiment of the invention.

A third embodiment of the invention is a backlight apparatus. Please refer to FIG. 6. FIG. 6 shows a scheme diagram of the structure of the backlight apparatus. As shown in FIG. 6, the backlight apparatus 3 includes a power source 30, a first transformer 31, a second transformer 32, a third transformer 33, a first light pipe 34, a second light pipe 35, and a third light pipe 36. Wherein, the first transformer 31 is coupled to the first light pipe 34 and the second transformer 32; the second transformer 32 is coupled to the second light pipe 35 and the third transformer 33; the third transformer 33 is coupled to third light pipe 36; the power source 30 is coupled to the first transformer 31 and the third transformer 33, and used to provide the electricity for the first light pipe 34, the second light pipe 35, and the third light pipe 36 of the backlight apparatus 3 to emit lights.

Next, the first transformer 31, the second transformer 32, and the third transformer 33 will be introduced respectively.

In this embodiment, since the jump connection is unnecessary to the first transformer 31, therefore, the first transformer 31 can be an ordinary transformer without any jump pins. As shown in FIG. 6, the first transformer 31 includes a first pin 311, a second pin 312, a third pin 313, a fourth pin 314, a first primary winding 315, and a first secondary winding 316. Wherein, the first primary winding 315 is corresponding to the first secondary winding 316; the first secondary winding 316 is coupled to the first pin 311 and the second pin 312; the first pin 311 is coupled to the first light pipe 34.

As to the second transformer 32 and the third transformer 33, since the jump connection is necessary to both of them, the second transformer 32 and the third transformer 33 are transformers with jump pin. As shown in FIG. 6, the second transformer 32 includes a second jump pin 320, a fifth pin 321, a sixth pin 322, a seventh pin 323, a eighth pin 324, a second primary winding 325, and a second secondary winding 326. Wherein, the second primary winding 325 is corresponding to the second secondary winding 326; the second secondary winding 326 is coupled to the fifth pin 321 and the sixth pin 322; the fifth pin 321 is between the second jump pin 320 and the sixth pin 322; the fifth pin 321 is coupled to the second light pipe 35; the second jump pin 320 will be coupled to the second pin 312 of the first transformer 31.

In fact, in order to reduce the conventional jump structure in the circuit of the backlight apparatus 3, the second jump pin 320 is coupled to the second pin 322 inside the second transformer 32. In fact, the second jump pin 320 can be coupled to the second pin 322 via an inner wire 329 inside the second transformer 32, or coupled to the second pin 322 via a metal plate embedded in the second transformer 32. Actually, the metal plate can be an iron plate, a copper plate, or any other metal plates capable of conducting electricity.

Similarly, the third transformer 33 includes a third jump pin 330, a ninth pin 331, a tenth pin 332, a eleventh pin 333, a twelfth pin 334, a third primary winding 335, and a third secondary winding 336. Wherein, the third secondary winding 336 is corresponding to the third primary winding 335; the third secondary winding 336 is coupled to the ninth pin 331 and the tenth pin 332; the ninth pin 331 is between third jump pin 330 and the tenth pin 332; the ninth pin 331 is coupled to third light pipe 36; the third jump pin 330 will be coupled to the sixth pin 322 of the second transformer 32.

In fact, the third jump pin 330 can be coupled to the tenth pin 332 via an inner wire 339 inside the third transformer 33, or coupled to the tenth pin 332 via a metal plate embedded in the third transformer 33. Actually, the metal plate can be an iron plate, a copper plate, or any other metal plates capable of conducting electricity.

Figure 2:
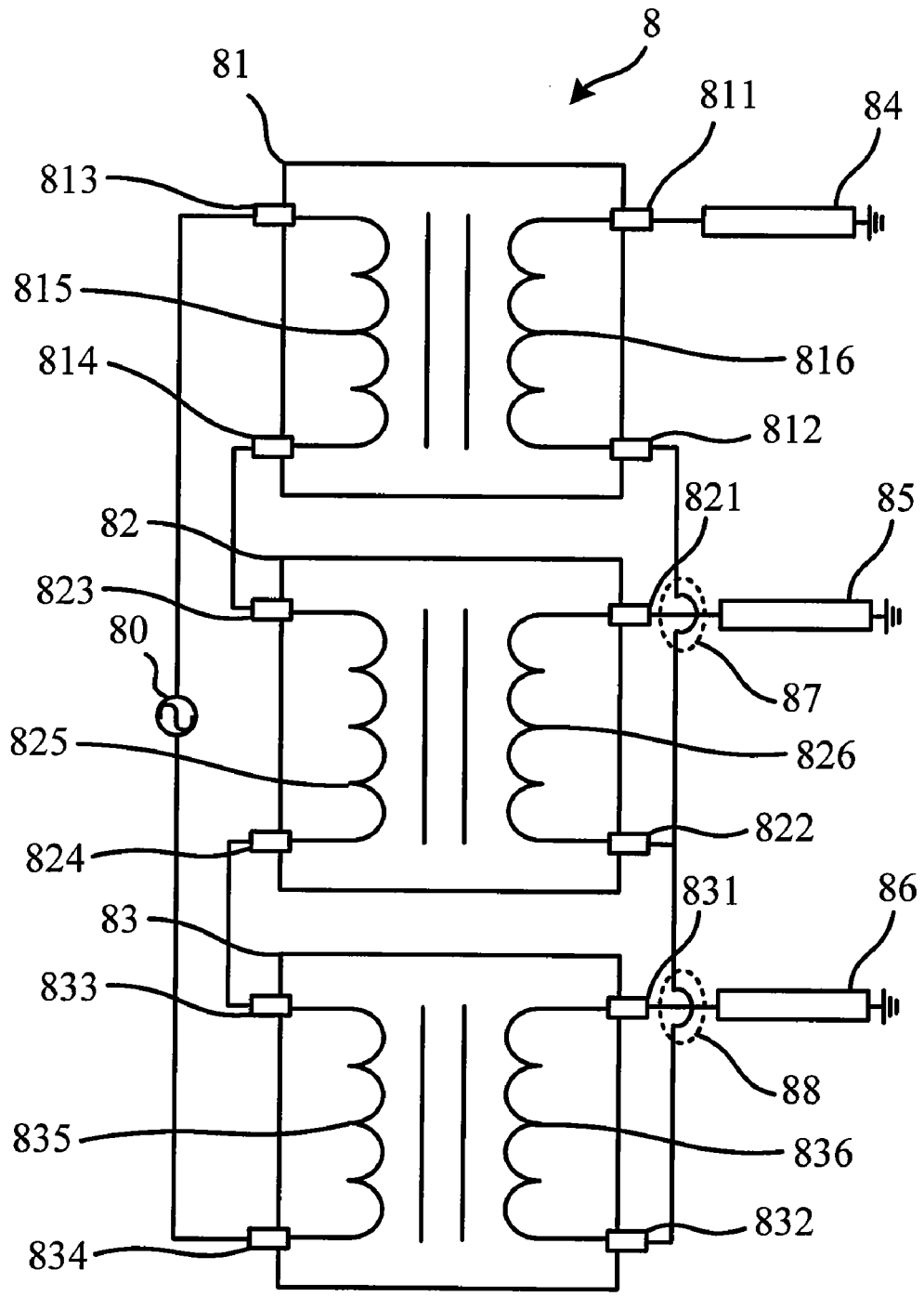
FIG. 2 shows a scheme diagram of another backlight apparatus with jump structures in the prior art.

Then, the backlight apparatus 3 shown in FIG. 6 and the backlight apparatus 8 with jump structures shown in FIG. 2 will be compared to show the advantages of the backlight apparatus 3 disclosed in this embodiment.

In the backlight apparatus 8 shown in FIG. 2, since the wire will cross a first wire between the fifth pin 821 and the second light pipe 85 and cross the second wire between the ninth pin 831 and the third light pipe 86, therefore, there will be a first jump structure 87 and a second jump structure 88 on the wire, so that there will be a suitable distance between the crossed wires.

However, in the backlight apparatus 3 disclosed by this embodiment, since the second pin 312 is coupled to the second jump pin 320 and the second jump pin 320 is coupled to the sixth pin 322 through the inside of the second transformer 32 instead of being directly coupled to the sixth pin 322, so that the first jump structure 87 shown in FIG. 2 can be reduced.

Similarly, since the sixth pin 322 is coupled to the third jump pin 330 and the third jump pin 330 is coupled to the tenth pin 332 through the inside of the third transformer 33 instead of being directly coupled to the tenth pin 332, so that the first jump structure 88 shown in FIG. 2 can be reduced.

By doing so, the wire connections in the circuit of the backlight apparatus 3 can be performed through the inside of the second transformer 32 and the third transformer 33.

Therefore, the backlight 3 can effectively reduce the jump structure 95 in the conventional circuit, not only the wire connections of the circuit layout will become simpler, but also the manufacturing cost of the backlight apparatus 3 can be lowered.

Compared to the prior arts, the transformer provided in this invention and the backlight apparatus including the transformer can reduce the jump structures used between the transformers in the conventional backlight apparatus, so that not only the wire connections in the circuit layout will become simple, but also the manufacturing cost of the backlight apparatus can be lowered to increase the competitiveness of the backlight apparatus on the market.

Although the present invention has been illustrated and described with reference to the preferred embodiment thereof, it should be understood that it is in no way limited to the details of such embodiment but is capable of numerous modifications within the scope of the appended claims.

What is claimed is:

1. A backlight apparatus, comprising:
    a power source;
    a first light pipe; and
    a first transformer, comprising:
        a first pin;
        a second pin;
        a first side winding;
        a second side winding, corresponding to the first side winding, the second side winding being coupled to the first pin and the second pin; and
        a jump pin, the first pin being between the jump pin and the second pin, the jump pin being coupled to the second pin inside the first transformer.
2. The backlight apparatus of claim 1, wherein the jump pin is coupled to the second pin via a metal plate embedded in the first transformer.
3. The backlight apparatus of claim 1, wherein the first side winding forms a loop.
4. The backlight apparatus of claim 1, wherein the first pin is coupled to the first light pipe.
5. The backlight apparatus of claim 1, wherein the first side winding is coupled to the power source.
6. The backlight apparatus of claim 1, wherein the second pin is coupled to the power source.
7. The backlight apparatus of claim 1, further comprising a second transformer.
8. The backlight apparatus of claim 7, wherein the second transformer is coupled to the jump pin.
9. The backlight apparatus of claim 7, wherein the second transformer is coupled to the second pin.
10. The backlight apparatus of claim 7, further comprising a second light pipe coupled to the second transformer.
11. A transformer, comprising:
    a first pin;
    a second pin;
    a first side winding;
    a second side winding, corresponding to the first side winding, the second side winding being coupled to the first pin and the second pin; and
    a jump pin, the first pin being between the jump pin and the second pin, the jump pin being coupled to the second pin inside the transformer.
12. The transformer of claim 11, wherein the jump pin is coupled to the second pin via a metal plate embedded in the transformer.
13. The transformer of claim 11, which is applied to a backlight apparatus.
14. The transformer of claim 11, wherein the first side winding is coupled to a power source.
15. The transformer of claim 11, wherein the first side winding forms a loop.
16. The transformer of claim 11, wherein the first pin is coupled to a light pipe.
17. The transformer of claim 11, wherein the second pin is coupled to a power source.

* * * * *